United States Patent
Richardson et al.

(10) Patent No.: US 8,087,092 B2
(45) Date of Patent: Dec. 27, 2011

(54) METHOD AND APPARATUS FOR DETECTION OF TAMPERING ATTACKS

(75) Inventors: Ric B. Richardson, Irvine, CA (US); Casey S. Potenzone, Los Angeles, CA (US); Benjamin T. Abraham, New York, NY (US); Farza Angha, San Francisco, CA (US); Hamid R. Younessi, New York, NY (US)

(73) Assignee: Uniloc USA, Inc., Irvine, CA (US)

( * ) Notice: Subject to any disclaimer, the term of this patent is extended or adjusted under 35 U.S.C. 154(b) by 952 days.

(21) Appl. No.: 11/470,235

(22) Filed: Sep. 5, 2006

(65) Prior Publication Data
US 2007/0143844 A1    Jun. 21, 2007

Related U.S. Application Data

(60) Provisional application No. 60/713,926, filed on Sep. 2, 2005.

(51) Int. Cl.
*G06F 7/04* (2006.01)
*G06F 11/30* (2006.01)
*G06F 12/14* (2006.01)
*G08B 23/00* (2006.01)
*G06F 17/30* (2006.01)

(52) U.S. Cl. ............. 726/33; 726/32; 713/187; 713/188

(58) Field of Classification Search ............... 726/22–23, 726/32–33; 713/187–188
See application file for complete search history.

(56) References Cited

U.S. PATENT DOCUMENTS

| 4,351,982 A | 9/1982 | Miller et al. |
| 4,658,093 A | 4/1987 | Hellman |
| 4,704,610 A | 11/1987 | Smith et al. |
| 4,796,220 A | 1/1989 | Wolfe |
| 5,210,795 A | 5/1993 | Lipner et al. |
| 5,260,999 A | 11/1993 | Wyman |
| 5,291,598 A | 3/1994 | Grundy |
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,509,070 A | 4/1996 | Schull |

(Continued)

FOREIGN PATENT DOCUMENTS

AU        678985        6/1997
(Continued)

OTHER PUBLICATIONS

Williams, R., "A Painless Guide to CRC Error Detection Algorithms," Aug. 13, 1993, 33 pages, www.ross.net/crc/download/crc_v3.txt.

(Continued)

*Primary Examiner* — Michael Simitoski
(74) *Attorney, Agent, or Firm* — Sean D. Burdick

(57) ABSTRACT

A method for detecting an attempted attack on a security system. In one preferred embodiment of the present invention, the method includes the step of retrieving a parameter from a hardware system, wherein the parameter changes during an operation of the hardware system. Then, comparing the retrieved parameter with a previously stored parameter; and, detecting a lack of change between the retrieved parameter and the previously stored parameter. An apparatus and an article of manufacture for detecting an attempted attack on a security system is also disclosed.

17 Claims, 4 Drawing Sheets

U.S. PATENT DOCUMENTS

| | | | |
|---|---|---|---|
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 6,009,401 A | 12/1999 | Horstmann | |
| 6,044,471 A | 3/2000 | Colvin | |
| 6,134,659 A | 10/2000 | Sprong et al. | |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,243,469 B1 | 6/2001 | Kataoka et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,536,005 B1 | 3/2003 | Augarten | |
| 6,785,825 B2 | 8/2004 | Colvin | |
| 6,804,257 B1 | 10/2004 | Benayoun et al. | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cogmigni et al. | |
| 7,085,741 B2 | 8/2006 | Lao et al. | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,319,987 B1 * | 1/2008 | Hoffman et al. | 705/44 |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,457,951 B1 * | 11/2008 | Proudler et al. | 713/164 |
| 7,463,945 B2 | 12/2008 | Kiesel et al. | |
| 7,644,442 B2 | 1/2010 | Miller et al. | |
| 7,653,899 B1 | 1/2010 | Lindahl et al. | |
| 7,739,402 B2 | 6/2010 | Roese | |
| 2001/0034712 A1 | 10/2001 | Colvin | |
| 2001/0044782 A1 * | 11/2001 | Hughes et al. | 705/59 |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0033541 A1 | 2/2003 | Edmark et al. | |
| 2003/0065918 A1 | 4/2003 | Wiley | |
| 2003/0172035 A1 | 9/2003 | Cronce et al. | |
| 2003/0218629 A1 | 11/2003 | Terashima et al. | |
| 2004/0024860 A1 | 2/2004 | Sato et al. | |
| 2004/0030912 A1 * | 2/2004 | Merkle et al. | 713/200 |
| 2004/0059929 A1 | 3/2004 | Rodgers et al. | |
| 2004/0059938 A1 | 3/2004 | Hughes et al. | |
| 2004/0066417 A1 | 4/2004 | Anabuki et al. | |
| 2004/0143746 A1 | 7/2004 | Ligeti et al. | |
| 2004/0172558 A1 | 9/2004 | Callahan et al. | |
| 2004/0187018 A1 | 9/2004 | Owen et al. | |
| 2004/0215661 A1 | 10/2004 | Zhang et al. | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2006/0026442 A1 | 2/2006 | Ittogi | |
| 2006/0072444 A1 | 4/2006 | Engel et al. | |
| 2006/0095454 A1 | 5/2006 | Shankar et al. | |
| 2006/0161914 A1 | 7/2006 | Morrison et al. | |
| 2006/0265337 A1 | 11/2006 | Wesinger, Jr. | |
| 2006/0265758 A1 | 11/2006 | Khandelwai et al. | |
| 2006/0282511 A1 | 12/2006 | Takano et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0255947 A1 | 11/2007 | Choudhury et al. | |

FOREIGN PATENT DOCUMENTS

| | | |
|---|---|---|
| EP | 1 637 958 | 3/2006 |
| EP | 1 637 961 | 3/2006 |
| EP | 1 670 188 | 6/2006 |
| WO | WO 92/20022 | 11/1992 |
| WO | WO 93/01550 | 1/1993 |
| WO | WO 95/35533 | 12/1995 |
| WO | WO 98/42098 | 9/1998 |
| WO | WO 00/67095 | 11/2000 |
| WO | WO 01/55876 | 8/2001 |
| WO | WO 2005/104686 | 11/2005 |
| WO | WO 2007/060516 | 5/2007 |
| WO | WO 2007/022134 | 7/2007 |
| WO | WO 2008/013504 | 1/2008 |

OTHER PUBLICATIONS

"Technical Details on Microsoft Product Activation for Windows XP," Internet Citation, XP002398930, Aug. 13, 2001.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

* cited by examiner

Devices and parameters that rarely change

Devices and parameters that change

Devices and parameters that always change

METHOD AND APPARATUS FOR DETECTION OF TAMPERING ATTACKS

CLAIM OF PRIORITY UNDER 35 U.S.C. §119

The present Application for Patent claims priority to Provisional Application No. 60/713,926, entitled "Method for detection of tampering attacks attempts against systems that use computing environments for identification purposes" filed Sep. 2, 2005, and assigned to the assignee hereof and hereby expressly incorporated by reference herein.

BACKGROUND

1. Field

The present invention relates generally to security in computing environments, and more particularly, to a method and apparatus for detection of tampering attacks against systems that use computing environments for identification purposes.

2. Background

Using a non-user configurable environment of a computing system has become a popular way of authenticating devices that run security programs as well as for managing the valid use of copy controlled and licensed software.

The use of parameter information to build a unique identity for that computing system is typically deployed in the software publishing and digital rights management industry. One common term used to describe the process is called hardware fingerprinting.

One of the important improvements to hardware fingerprinting is the concept of tolerance, which allows the computing system to tolerate a small number of changes to its environment without triggering a failure. A failure of the process occurs when the protected software detects that it is in use on a new or unknown device and therefore requires re-authentication.

The practice known as tolerance involves making queries to multiple device parameters and making a weighted and or prioritized decision about how many of those parameters are allowed to change before the controlling software decides to treat the computing environment as a new and unknown system requiring manual re-authentication.

The hardware fingerprinting system may be circumvented, however, if a rogue entity is able to interfere with the detection process of the protected software. For example, the rogue entity may emulate the hardware fingerprint of the original computing environment to fool the protected software to think that it is executing in the original computing environment.

SUMMARY OF THE PREFERRED EMBODIMENTS

The present invention provides a method for detecting an attempted attack on a security system. In one preferred embodiment of the present invention, the method includes the step of retrieving a parameter from a hardware system, wherein the parameter changes during an operation of the hardware system. Then, comparing the retrieved parameter with a previously stored parameter; and, detecting a lack of change between the retrieved parameter and the previously stored parameter.

An apparatus for detecting a tampering attempt in a security system is also disclosed. The apparatus includes a processor and a memory coupled to the processor. In one preferred embodiment, the memory is configured to cause the processor to execute a method including the step of retrieving a parameter from a hardware system, wherein the parameter changes during an operation of the hardware system. Then, comparing the retrieved parameter with a previously stored parameter; and, detecting a lack of change between the retrieved parameter and the previously stored parameter.

An article of manufacture including a computer-readable medium having instructions stored thereon for causing a processor to perform a method for detecting an attempted attack on a security system is also disclosed. The method including the steps of retrieving a parameter from a hardware system, wherein the parameter changes during an operation of the hardware system. Then, comparing the retrieved parameter with a previously stored parameter; and, detecting a lack of change between the retrieved parameter and the previously stored parameter.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

The present invention goes beyond standard tolerance systems to use the tolerance process and device parameters queries as a means of detecting when the software is under attack thereby allowing the software to take countermeasures to defend itself.

The invention is valuable in that it can be used to protect software that is used for security or copy control applications.

Further, the invention has significant value when compared with traditional anti-piracy and anti-tampering techniques such as check summing and encryption in that these can be configured to more effectively protect the target software when an attack has been detected.

The present invention will provide a method of detecting when attempts have been made to circumvent or interfere with security or copy control systems that use the non-user configurable information from a computing device for the purposes of identification and authentication.

One of the many ways to sample a computing environment for the purposes of uniquely identifying one system from another is to collect information from many or all available devices and many or all available device parameters to use them as a digital identifier.

Figure 1:
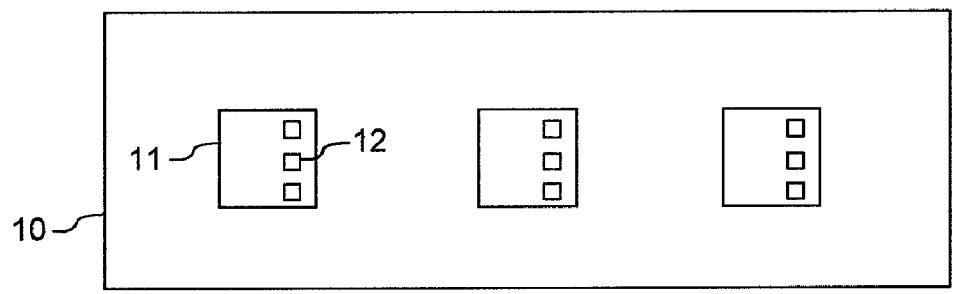
FIG. 1 illustrates an example of sample sets used in an identification process.
Figure 1:
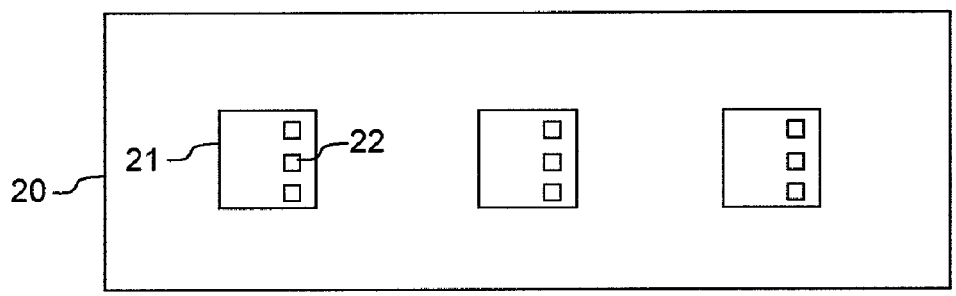
Figure 1:
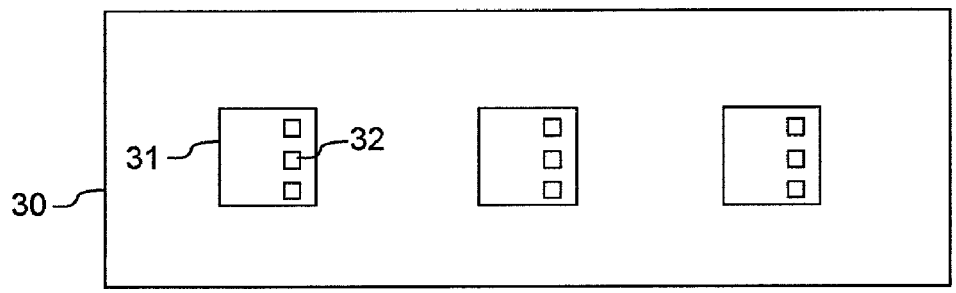

FIG. 1 describes one example of three sets of computing system device parameters (10, 20 and 30) that can be used for both uniquely identifying a computer system (10 and 20) and one set of device parameters (30) that can be used for detecting when an attacker is attempting to tamper with data collected during the query of device parameters.

In FIG. 1, the first device parameter set 10 contains devices 11 and device parameters 12 that rarely change from one query to the next in a series of successive queries over time. Examples of device parameters that rarely change over time on a computer are the device parameter for the manufacturer of the motherboard and the make and model parameters for the central processing unit. The devices in this set can also be included in other sets. That is, devices may have one or more parameter in each of the device parameter sets 10, 20, and 30. However, device parameters cannot be shared across different sets since device parameters are unique to each set of device parameters.

The second set of device parameters 20 also contains devices 21 and device parameters 22. However, these device parameters are different from the device parameters 12 of the first set 10 in that these device parameters 22 do change from time to time during the course of the useful life of the computing system. Examples of device parameters that can change over time on a computer are the device parameter related to the amount of random access memory contained in the computer and the device parameter related to the serial number(s) of the hard drive(s) in the computer.

The third set of device parameters 30 also contains devices 31 and device parameters 32. Unlike the first device parameters set 10 and the second parameter set 20, the third device parameter set 30 includes only device parameters that change over time during the operation of the computer. Device parameters that change on a computer include, but are not limited to, device parameters related to the keeping track of time on the computing system and device parameters related to data that rapidly changes while the device is in use by a processing unit or random access memory. For example, the amount of memory used as well as the content of the random access memory may be used as device parameters.

Figure 2:
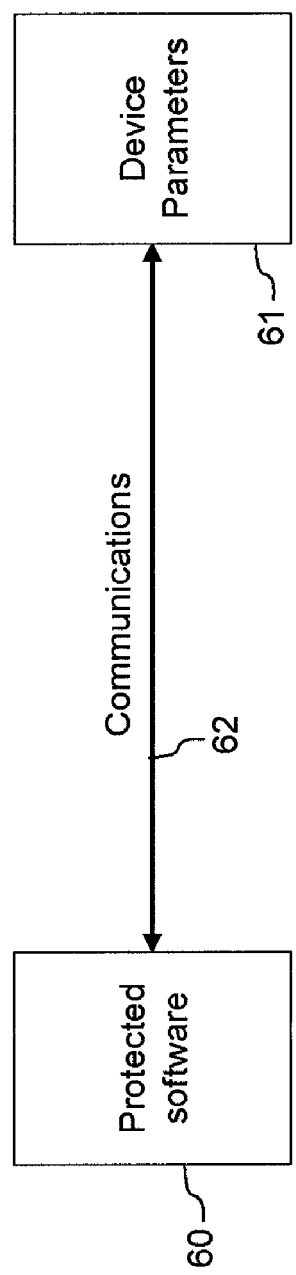
FIG. 2 illustrates an example of existing software to device communications.

FIG. 2 illustrates a normal communication 62 between software 60 that is protected from execution on unauthorized systems by verifying the identity of the computer system with the use of queries to device parameters 61.

Figure 3:
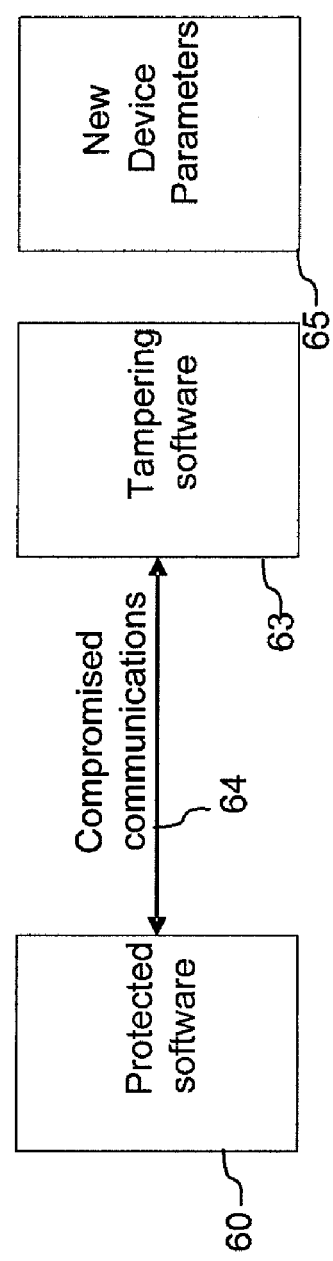
FIG. 3 illustrates an example of an existing method for tampering with software to device communications.

FIG. 3 illustrates a scenario of compromised communications 64 between protected software 60 and device parameters 61 (as described in FIG. 2). Specifically, FIG. 3 illustrates how tampering software 63 can be used to intercept software communications 62 between the protected software 60 and the computing systems device parameters 61 and return false information in the form of compromised communications 64 in an attempt to allow the protected software 60 to run on unauthorized computer systems, such as a computer system having different device parameters 65.

During the process of sampling a computer operating environment to build a unique identifier for that system the software usually collects a wide and diverse range of device parameters 10 and 20. There are numerous approaches for using these device parameters for the production of a unique identifier. The present invention adds an additional functionality to the sampling process by sampling device parameters that are known to always change 30.

Figure 4:
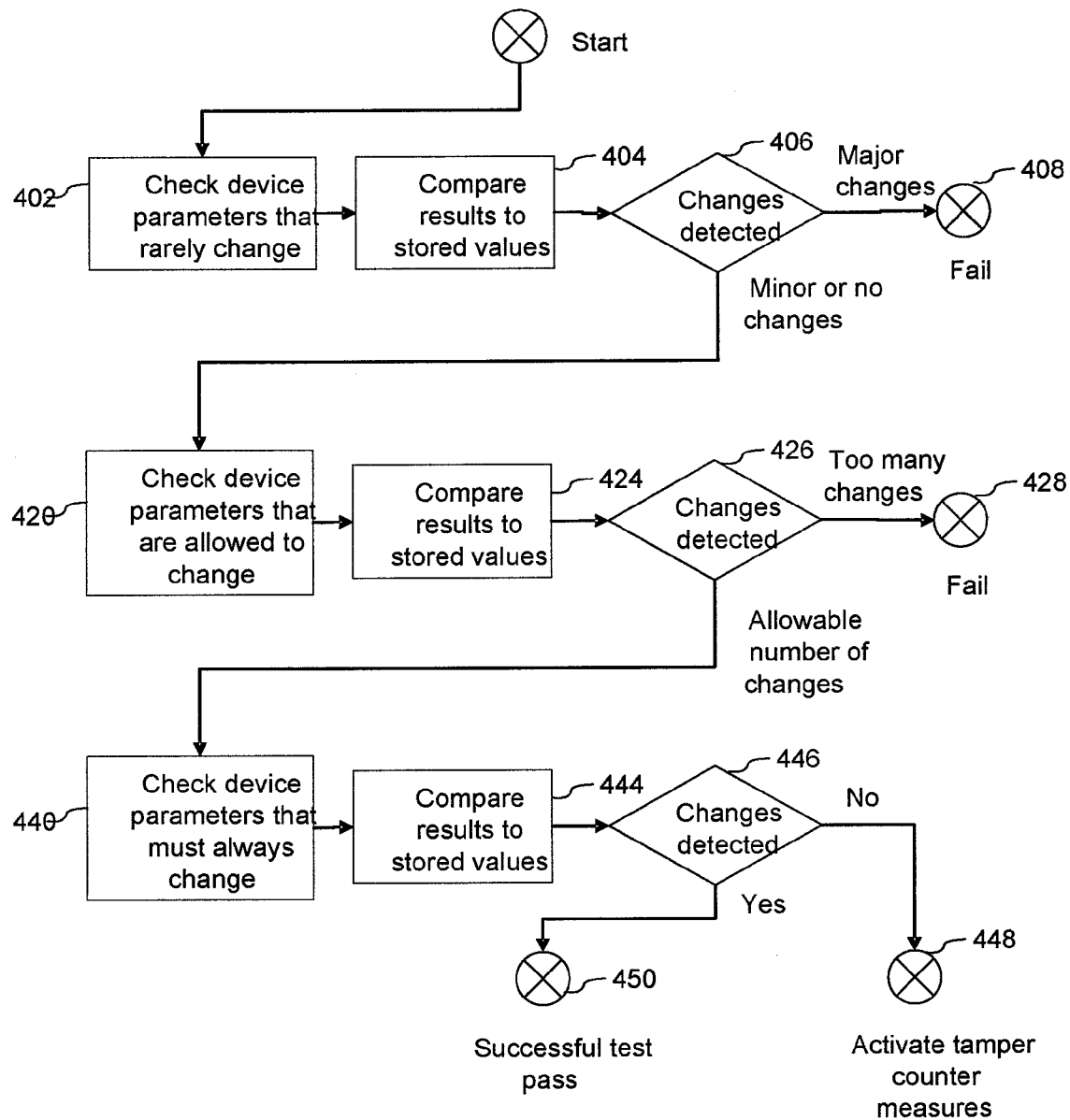
FIG. 4 illustrates an identification and tamper detection process that can be used to uniquely identify a computer system or a change thereto, and detect an attempt to tamper with software to device communications.

FIG. 4 describes a process configured in accordance to one preferred invention of the present invention for use in a computer identification system that includes the ability to uniquely identify a computing system and detect when tampering is being attempted against the identification system.

Initially, the parameters of the first set of device parameters 10 are queried using a series of software commands in step 402. The results of this query in step 402 are compared with a stored version of the same parameter query in step 404. The results of the comparison are then computed in step 406. If major changes are found between the stored version of the query and the generated version of the query in step 406 then the authentication process fails and operation continues with step 408. If there are minor or no changes detected in the comparison of the stored parameter query and generated version in step 406, then the process proceeds to step 420.

Queries are made for device parameters that are allowed to change in step 420. These are compared with a stored version of the same query in step 424. If too many changes are detected in step 426, then the authentication fails and operation continues with step 428. If an allowable number of changes are detected in step 426 then the process proceeds to step 440.

Next queries are made for device parameters that must always change in step 440. These are compared with a stored version of the same query in step 444. If no changes are detected in 446, then authentication fails and operation continues with step 448. However, if changes are detected in step 446, then the authentication is considered to have been successfully completed and operation continues with 450.

As discussed herein, the present invention adds an additional functionality to the sampling process by sampling device parameters that are known to always change 30. This functionality serves the purpose of laying a trap for attackers or others who wishes to tamper with the software 60 since a standard way of attacking and stress testing software is to intercept the normal communications 62 of the software 60 with the computing environment and the operating system and to feed falsified or compromised information 64 to the software 60. The intent is to deceive the software 60 into allowing it to run in an unprotected or compromised state.

Since the attacker is in the process of learning what information is needed by the software 60 to run in a compromised state, the attacker is initially unaware of what information is required by the software 60 to operate successfully.

The presumption that there is a correct answer to any query made by the software 60 means that the attacker will attempt to send data in different combinations, including duplicate values, to the software the attacker is trying to defeat.

Herein is the value of the invention in that sending duplicate data to a device parameter query that is intentionally meant to be different on every query means that attempted tampering can be detected, as discussed above in FIG. 4, and countermeasures taken.

An alternative embodiment could include where the querying of the device parameters does not occur in three separate processes, but where each individual device parameter is queried individually in a randomized or varied order so that queries to device parameters that must always change 32 are interspersed with queries to device parameters that sometimes change 22 and others where the device parameters rarely change 12. This approach increases the difficulty for an attacker to determine which queries are designed as tamper detection steps versus the queries that are part of the normal identification and authentication process.

Another alternative embodiment could include but is not to be limited to a system as described in FIG. 4, where device parameters are not separated into different sets but are queried as one continuous set. The method is still useful in this scenario since the object of using it is to detect tampering and not to add capabilities to the tolerance process as such.

It should be noted that the methods described herein may be implemented on a variety of communication hardware, processors and systems known by one of ordinary skill in the art. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as the most preferred or advantageous over other embodiments. Accordingly, the present invention is to be defined solely by the scope of the following claims.

What is claimed is:

1. A computer-implemented method for detecting an attempted attack on a security system, comprising:
    on a computer, retrieving responsive to a first query a first device parameter from a hardware system requesting access to the security system, the first device parameter being allowed to change during useful life of the hardware system within a defined tolerance without exceeding authentication criteria;
    comparing the retrieved first device parameter to a first stored parameter retrieved responsive to an earlier incidence of the first query;
    on the computer, retrieving, responsive to a second query made after a random time delay a second device parameter from the hardware system, the second device parameter comprising data that rapidly changes such that the data is different for every query when the hardware system is queried at random time intervals during operation of the hardware system;
    comparing the retrieved second device parameter with a second stored parameter retrieved responsive to an incidence of the second query made prior to the time delay; and
    triggering an authentication failure in response to (i) detecting a difference between the retrieved first device parameter and the first stored parameter that exceeds the defined tolerance or (ii) detecting no change between the retrieved second device parameter and the second stored parameter.

2. The method of claim 1 wherein the second device parameter changes over time during the operation of the hardware system such that the retrieved second device parameter is different for any time delay.

3. The method of claim 1, wherein the hardware system comprises a computing system, and wherein the first device parameter and the second device parameter are both retrieved from a device within the computing system.

4. The method of claim 1, further comprising:
    on the computer, retrieving responsive to a third query a third device parameter from the hardware system, the third device parameter rarely changing during the operation of the hardware system; and
    comparing the retrieved third device parameter with a third stored parameter retrieved responsive to an earlier incidence of the third query;
    wherein the triggering step further comprises triggering the authentication failure in response to (iii) detecting a change between the retrieved third device parameter and the third stored parameter.

5. The method of claim 4, wherein
    the first, second and third queries are each executed in multiple instances; and
    the random delay is achieved by executing the multiple instances of the first, second and third queries in a randomized order.

6. The method of claim 1, wherein
    the first and second queries are each executed in multiple instances; and
    the random time delay is achieved by executing the multiple instances of the first and second queries in a randomized order.

7. An apparatus for detecting a tampering attempt in a security system, comprising:
    a processor;
    a memory coupled to the processor, the memory configured to cause the processor to execute a method comprising:
        retrieving, responsive to a first query a first device parameter from a hardware system requesting access to the security system, the first device parameter being allowed to change during useful life of the hardware system within a defined tolerance without exceeding authentication criteria;
        comparing the retrieved first device parameter to a first stored parameter retrieved responsive to an earlier incidence of the first query;
        retrieving, responsive to a second query made after a random time delay a second device parameter from the hardware system, the second device parameter comprising data that rapidly changes such that the data is different for every query when the hardware system is queried at random time intervals during operation of the hardware system;

comparing the retrieved second device parameter with a second stored parameter retrieved responsive to an incidence of the second query made prior to the time delay; and triggering an authentication failure in response to (i) detecting a difference between the retrieved first device parameter and the first stored parameter that exceeds the defined tolerance or (ii) detecting no change between the retrieved second device parameter and the second stored parameter.

8. The apparatus of claim 7, wherein the second device parameter changes over time during the operation of the hardware system such that the retrieved second device parameter is different for any time delay.

9. The apparatus of claim 7, wherein the hardware system comprises a computing system, and wherein the first device parameter and the second device parameter are both retrieved from a device within the computing system.

10. The apparatus of claim 7, wherein the method further comprises:

retrieving responsive to a third query a third device parameter from the hardware system, the third device parameter rarely changing during the operation of the hardware system; and comparing the retrieved third device parameter with a third stored parameter retrieved responsive to an earlier incidence of the third query; and wherein the triggering step further comprises triggering the authentication failure in response to (iii) detecting a change between the retrieved third device parameter and the third stored parameter.

11. An article of manufacture comprising a non-transitory computer-readable medium having instructions stored thereon for causing a processor to perform a method for detecting an attempted attack on a security system, the method comprising:

retrieving responsive to a first query a first device parameter from a hardware system requesting access to the security system, the first device parameter being allowed to change during useful life of the hardware system within a defined tolerance without exceeding authentication criteria;

comparing the retrieved first device parameter to a first stored parameter retrieved responsive to an earlier incidence of the first query;

retrieving, responsive to a second query made after a random time delay, a second device parameter from the hardware system, the second device parameter comprising data that rapidly changes such that the data is different for every query when the hardware system is queried at random time intervals during an operation of the hardware system;

comparing the retrieved second device parameter with a second stored parameter retrieved responsive to an incidence of the second query made prior to the time delay; and triggering an authentication failure in response to (i) detecting a difference between the retrieved first device parameter and the first stored parameter that exceeds the defined tolerance or (ii) detecting no change between the retrieved second device parameter and the second stored parameter.

12. The article of manufacture of claim 11, wherein the second device parameter changes over time during the operation of the hardware system such that the retrieved second device parameter is different for any time delay.

13. The article of manufacture of claim 11, wherein the hardware system comprises a computing system, and wherein the first device parameter and the second device parameter are both retrieved from a device within the computing system.

14. The article of manufacture of claim 11, wherein the method further comprises:

retrieving responsive to a third query a third device parameter from the hardware system, the third device parameter rarely changing during the operation of the hardware system; and comparing the retrieved third device parameter with a third stored parameter retrieved responsive to an earlier incidence of the third query;

wherein the triggering step further comprises triggering the authentication failure in response to (iii) detecting a change between the retrieved third device parameter and the third stored parameter.

15. A computer-implemented method for detecting an attempted attack on a security system, comprising:

querying, by the security system, and responsive to a hardware system requesting access to the security system, the hardware system for a device parameter comprising data that rapidly changes such that the data is different for every query when the hardware system is queried at random time intervals during operation of the hardware system;

retrieving the device parameter responsive to the query;

storing the device parameter for the retrieval by the security system;

querying, by the security system and after a random time delay, the hardware system a second time for the device parameter;

retrieving an updated device parameter responsive to the second query;

comparing the stored device parameter to the updated device parameter; and triggering an authentication failure if the comparison detects no change.

16. The method of claim 15 wherein the device parameter comprises data that changes responsive to use of a device by a processing unit.

17. The method of claim 16 wherein the device comprises random access memory and the data comprises an amount of the memory in use by the processing unit.

* * * * *